May 6, 1947.  H. VAN SUCHTELEN  2,420,156
DEVICE FOR ELECTRO-MAGNETIC DEFLECTION OF A CATHODE-RAY
Filed March 23, 1943
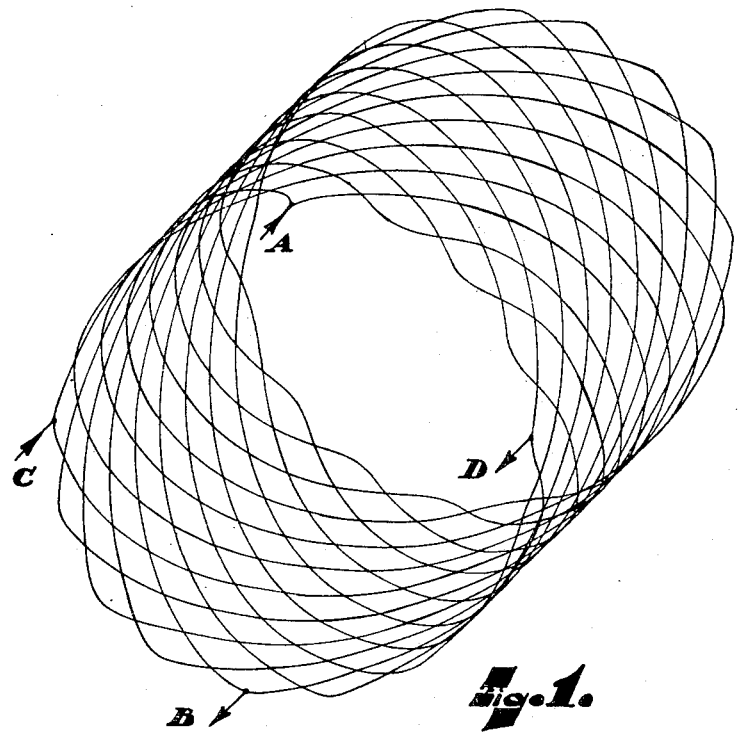
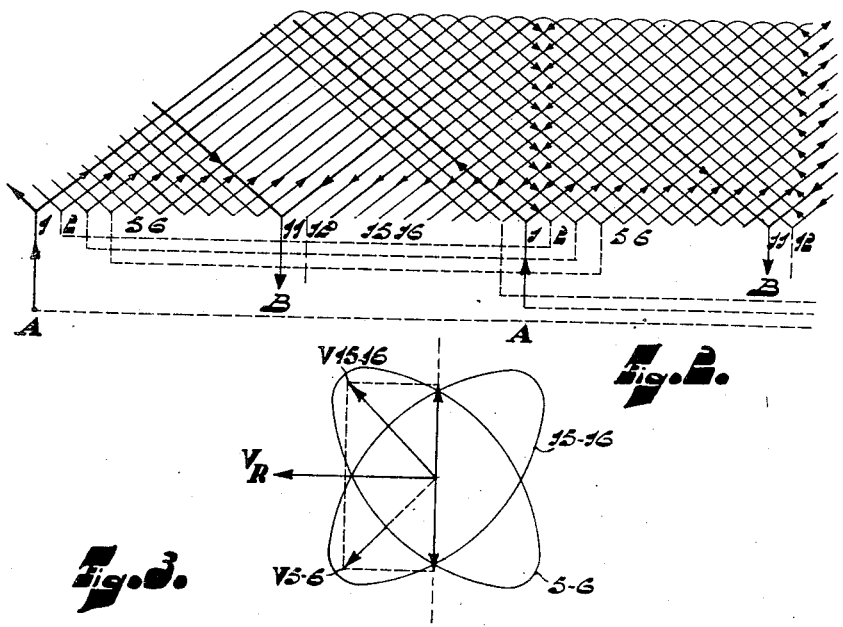
Inventor
Harold van Suchtelen
By  *H. S. Grover*
Attorney Patented May 6, 1947

2,420,156

UNITED STATES PATENT OFFICE 2,420,156

DEVICE FOR ELECTROMAGNETIC DEFLECTION OF A CATHODE-RAY

Harold van Suchtelen, Eindhoven, Netherlands, assignor to Hartford National Bank and Trust Company, Hartford, Conn., as trustee Application March 23, 1943, Serial No. 480,181
In the Netherlands August 31, 1939

5 Claims. (Cl. 250—156)

It is known to curve or to wind the deflection coils for cathode-ray tubes in such manner that they cylindrically surround the tube as closely as possible. In this manner the efficiency of the coil is increased, it is true, but it is difficult mechanically to wind a coil having such a shape on a mandrel.

The present invention has for its object to provide a coil which also closely engages the wall of the tube but which can at the same time be wound mechanically in a simple manner.

According to the invention this is attained by surrounding the tube by one or more coils having a so-called cross-winding and by furnishing this coil or coils with diametrically opposed supply and carry-off points. For this purpose we proceed in such manner that the resultant of the axial field components of the separate turns is zero and that solely a transversal field is left.

For winding coils with cross-winding (for instance the well-known honeycomb coils) machines are known so that mass-production of these coils does not entail any difficulty whatsoever.

By furnishing the coil with two or more pairs of supply and carry-off points, whose diametrical connecting lines are at an angle with each other, it is possible to deflect the cathode-ray in a corresponding number of directions. For television purposes use may be made, for instance, of two of such pairs whose connecting lines extend normally to each other. Thus, instead of four separate coils, which are usually necessary, only one coil according to the invention is sufficient in this case, which coil, moreover, can be easily manufactured and has an eminently suitable shape for the purpose.

The invention will be more fully explained by reference to the accompanying drawing representing, by way of example, one embodiment thereof.

In this drawing

Fig. 1 is a schematic-perspective view of a coil according to the invention.

Fig. 2 is a diagram of the winding shown in Fig. 1 developed in a plane.

Fig. 3 is a diagram of the fields of two symmetric turns.

The cylindrical coil shown in Fig. 1 consists of two layers of turns which cross each other. When applying a voltage between the diametrically opposed points A and B, the coil is traversed by current in two parallel branches and a field is set up at right angles to the direction A—B. The same holds good for C and D. The course of the winding appears from Fig. 2 where the turns are developed in a plane and the connections, cut open for this purpose, are represented in dotted lines. In the coil the two points 2, for instance, engage each other, like points 12 and so on.

The winding thus produced may be imagined to consist of a number of pairs of closed turns symmetrically arranged in pairs relatively to the axis of the coil.

Fig. 3 shows such a pair of turns situated in the centre of gravity of the winding, viz., turn 5—6 and turn 15—16. With a definite direction of the voltage applied between A and B the field of turn 5—6 may be represented by $V_{5-6}$ and that of the turn 15—16 by $V_{15-16}$. In this case the resolved components according to the vertical axis of rotation of the cylinder are equal and oppositely directed, whereas the two horizontal resolved components coincide with each other so that the resulting transverse field $V_R$ ensues which extends normally to the connecting line A—B.

Since the coil can be constructed radially-symmetrical the above holds good for every two other diametrically situated supply and carry-off points whose connecting line forms an angle with the line A—B. This feature may be employed with profit for scanning a picture-surface, viz., by applying an alternating voltage with line-frequency between A and B and an alternating voltage with picture-frequency between C and D in which case CD is preferably to be chosen normally to AB.

What I claim is:

1. A coil structure for producing a magnetic field for deflecting the cathode ray beam of a cathode ray tube comprising a coil composed of a series of active conductors spaced from each other about the circumference of said coil, a second series of active conductors spaced around the circumference of said coil and angularly inclined with respect to the first series of conductors, end connections joining one conductor of a series to a conductor of another series in a manner to produce a closed winding and terminal connections for said closed winding providing parallel paths for deflecting currents in said winding, the angular spacing of said terminals being selected to produce resultant fields of maximum flux and zero flux alternating progressively about said winding.

2. A device for producing magnetic fields for deflecting the cathode ray beam of a cathode ray tube comprising a coil having turns advancing progressively in pitch by one turn throughout the circumference of the coil, providing terminal connections to diametrically opposite turns of said winding whereby to obtain two paths in parallel through said winding, providing an additional pair of terminals to secure paths in parallel from said last named terminals, the points of connection of said second pair of terminals being so chosen that currents in conductors of said winding which are inclined with respect to each other produce resultant fields of maximum flux and zero flux alternating progressively about said winding.

3. The device set forth in claim 2 wherein said pairs of terminals are angularly spaced 90° with respect to each other, and wherein the pitch of said winding is such that each maximum resultant magnetic field is angularly spaced 90° from an adjacent section of zero flux.

4. A device for electromagnetically deflecting the beam in a cathode ray tube, in which a coil having cross-wound conductors is arranged to surround the beam produced in said tube, terminal points for feeding deflecting currents to said coil, said terminal points being diametrically opposed one and the other in such a manner that a transverse field capable of effecting the beam is produced and the resultant of the axial field components of the conductors is zero.

5. In a cathode ray tube system including means for developing and accelerating a cathode ray beam, an electromagnetic deflecting system for deflecting the beam comprising a single radial-symmetrical coil composed of a plurality of progressive angularly wound sections, each section comprising two conductors, all of said individual sections being serially connected, and means for impressing currents onto said coil at tapped portions thereof whereby the cathode ray beam may be deflected in two coordinates of motion by a single coil structure.

HAROLD van SUCHTELEN.

REFERENCES CITED

The following references are of record in the file of this patent:

UNITED STATES PATENTS

| Number | Name | Date |
| --- | --- | --- |
| 973,826 | Vreeland | Oct. 25, 1910 |
| 2,243,893 | Blumlein | June 3, 1941 |

FOREIGN PATENTS

| Number | Country | Date |
| --- | --- | --- |
| 514,170 | British | Nov. 1, 1939 |
| 528,801 | British | Nov. 7, 1940 |
| 541,596 | British | Dec. 3, 1941 |